United States Patent [19]
Kim

[11] Patent Number: 5,949,745
[45] Date of Patent: Sep. 7, 1999

[54] APPARATUS AND METHOD FOR RECORDING/REPRODUCING AN OPTICAL INFORMATION ON/FROM A RECORDING MEDIUM HAVING A WOBBLED GROOVE

[75] Inventor: Dae Young Kim, Seoul, Rep. of Korea

[73] Assignee: LG Electronics Inc., Seoul, Rep. of Korea

[21] Appl. No.: 08/879,709

[22] Filed: Jun. 20, 1997

[30] Foreign Application Priority Data

Jun. 22, 1996 [KR] Rep. of Korea .................. 23091/1996
Jul. 6, 1996 [KR] Rep. of Korea .................. 27342/1996

[51] Int. Cl.$^6$ ................................................. G11B 7/095
[52] U.S. Cl. .................................... 369/44.26; 369/44.29
[58] Field of Search ............................. 369/44.26, 44.27, 369/44.29, 44.35, 54, 58, 44.13

[56] References Cited

U.S. PATENT DOCUMENTS

| | | | |
|---|---|---|---|
| 5,311,490 | 5/1994 | Matoba | 369/44.26 |
| 5,568,461 | 10/1996 | Nishiuchi et al. | 369/44.26 |
| 5,715,217 | 2/1998 | Fuji | 369/44.26 |

Primary Examiner—Thang V. Tran

[57] ABSTRACT

An improved information recording/reproducing apparatus and a method thereof which are capable of performing a tracking control by judging whether a current recording or reproducing position is the track of a land or the track of a groove of a recording medium in a single-side wobbling method and varying the polarity of a tracking control signal in accordance with the judgement signal. The apparatus includes a signal detection unit for detecting lefthand and righthand detection signals from an optical beam with respect to a track center line of the first track or second track and detecting a tracking control signal from the lefthand and righthand detection signals, a land/groove track judgement unit for detecting a maximum value or envelope of the lefthand and righthand detection signals from the signal detection unit and judging whether a track in which the current optical beam is made incident on the first track or the second track, a signal conversion unit for passing-through or inverting the tracking control signal in accordance with a land/groove judgement signal V0 from the land/groove track judgement unit, and a tracking servo unit for performing a tracking control of an optical pickup unit in accordance with a tracking control signal from the signal conversion unit.

12 Claims, 10 Drawing Sheets

LAND GROOVE

GROOVE LAND

APPARATUS AND METHOD FOR RECORDING/REPRODUCING AN OPTICAL INFORMATION ON/FROM A RECORDING MEDIUM HAVING A WOBBLED GROOVE

BACKGROUND OF THE INVENTION

1. Field of the Invention

The present invention relates to an information recording/reproducing apparatus and a method thereof, and in particular to an improved information recording/reproducing apparatus and a method thereof which are capable of more effectively recording and reproducing an information on/from a recording medium having a wobbled groove.

2. Description of the Conventional Art

Recently, various types of information recording medium are used for large capacity information recording.

Among them, a recording medium having a recording track formed in a wobbling form at a predetermined period and implemented in a so-called wobbling method is widely used. Here, the land is defined between grooves, and a curved portion is called a wobbling portion.

In addition, there is further known a CD-R (Recordable) as one of recording media which adopts the wobbling method. The wobbling, as shown in FIG. 1, has a predetermined width and depth. In addition, the wobbling at both surfaces contacting with the land with respect to the track center line of the groove is formed in the identical phase.

An FM carrier is performed by the wobbling. A particular information, for example an address information, which indicates a physical position of a disk, is FM-modulated and then is recorded.

When both surfaces contacting with the groove and land are wobbled, since information is recorded only on the track of the groove, there is a limit for increasing the recording density.

Therefore, in order to increase the recording density, a method of recording information on the land and groove of the recording medium is disclosed. Among them, as shown in FIG. 2, a wobbling portion is defined in one surface of both surfaces contacting with the groove and land. In addition, there is a single-side wobbling method so that the land and groove include the wobbling portion.

In the recording medium for adopting the single-side wobbling, the land and groove must be provided in order to perform a tracking control. In addition, since the recording or reproducing condition must be changed in accordance with the judged land or groove, a proper land/groove judgement method is used.

SUMMARY OF THE INVENTION

Accordingly, it is an object of the present invention to provide an information recording/reproducing apparatus and a method thereof which overcome the aforementioned problem encountered in the conventional art.

It is another object of the present invention to provide an improved information recording/reproducing apparatus and a method thereof which are capable of performing a recording or reproducing operation in accordance with a judgement signal by judging whether a current recording or reproducing position is a track of a land or a track of a groove of a recording medium in a single-side wobbling method.

It is another object of the present invention to provide an improved information recording/reproducing apparatus and a method thereof which are capable of performing a tracking control by judging whether a current recording or reproducing position is a track of a land or a track of a groove of a recording medium in a single-side wobbling method and varying the polarity of a tracking control signal in accordance with the judgement signal.

To achieve the above objects, there is provided an information recording/reproducing apparatus which includes a signal detection unit for detecting lefthand and righthand detection signals from an optical beam with respect to a track center line of the first track or second track and detecting a tracking control signal from the lefthand and righthand detection signals, a land/groove track judgement unit for detecting a maximum value or envelope of the lefthand and righthand detection signals from the signal detection unit and judging whether a track in which the current optical beam is made incident on the first track or the second track, a signal conversion unit for passing-through or inverting the tracking control signal in accordance with a land/groove judgement signal V0 from the land/groove track judgement unit, and a tracking servo unit for performing a tracking control of an optical pickup unit in accordance with a tracking control signal from the signal conversion unit.

To achieve the above objects, there is provided an information recording/reproducing method according to a first embodiment of the present invention, which includes the steps of detecting lefthand and righthand signals split into lefthand and righthand directions with respect to a track direction by scanning an optical beam to the first track or second track, converting the lefthand and righthand detection signals split into lefthand and righthand directions with respect to a track direction by scanning an optical beam to the first track or second track, converting the lefthand and righthand detection signals into a second signal, respectively, comparing the lefthand and righthand second signals, and as a result of the comparison, judging whether a track on which the current optical beam is positioned is related to a first track or a second track.

To achieve the above objects, there is provided an information recording/reproducing method according to a second embodiment of the present invention, which includes the steps of detecting lefthand a righthand detection signals split into the lefthand and righthand directions with respect to a track direction b scanning an optical beam on the first track or the second track, subtracting the detected lefthand and righthand detection signals, and detecting a tracking control signal, detecting a maximum value or an envelope value of the lefthand and righthand signals, comparing the lefthand and righthand maximum values or the envelope values, as a result of the comparison, judging whether a track in which a current optical beam is positioned is related to a first track or a second track, and performing a tracking control by using the tracking control signal when the track is a first track as a result of the comparison and performing a tracking control by using a tracking control signal in which the polarity is inverted when the track is a second track as a result of the comparison.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
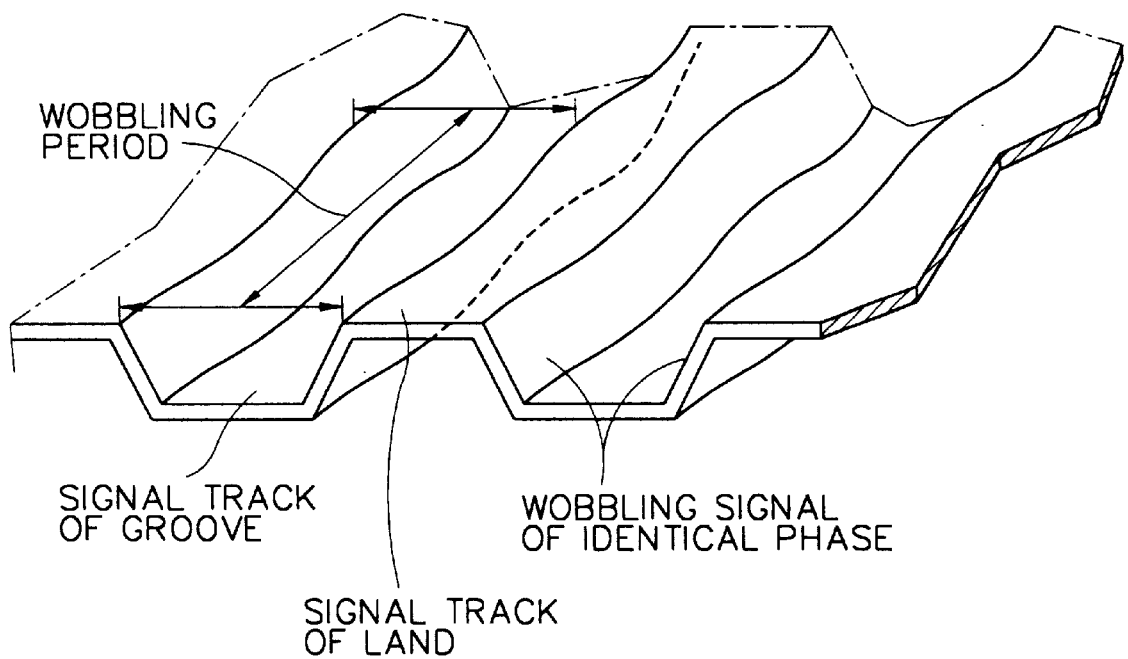
FIG. 1 is a view illustrating a track construction of a conventional CD-R.
Figures 2A, 2B:
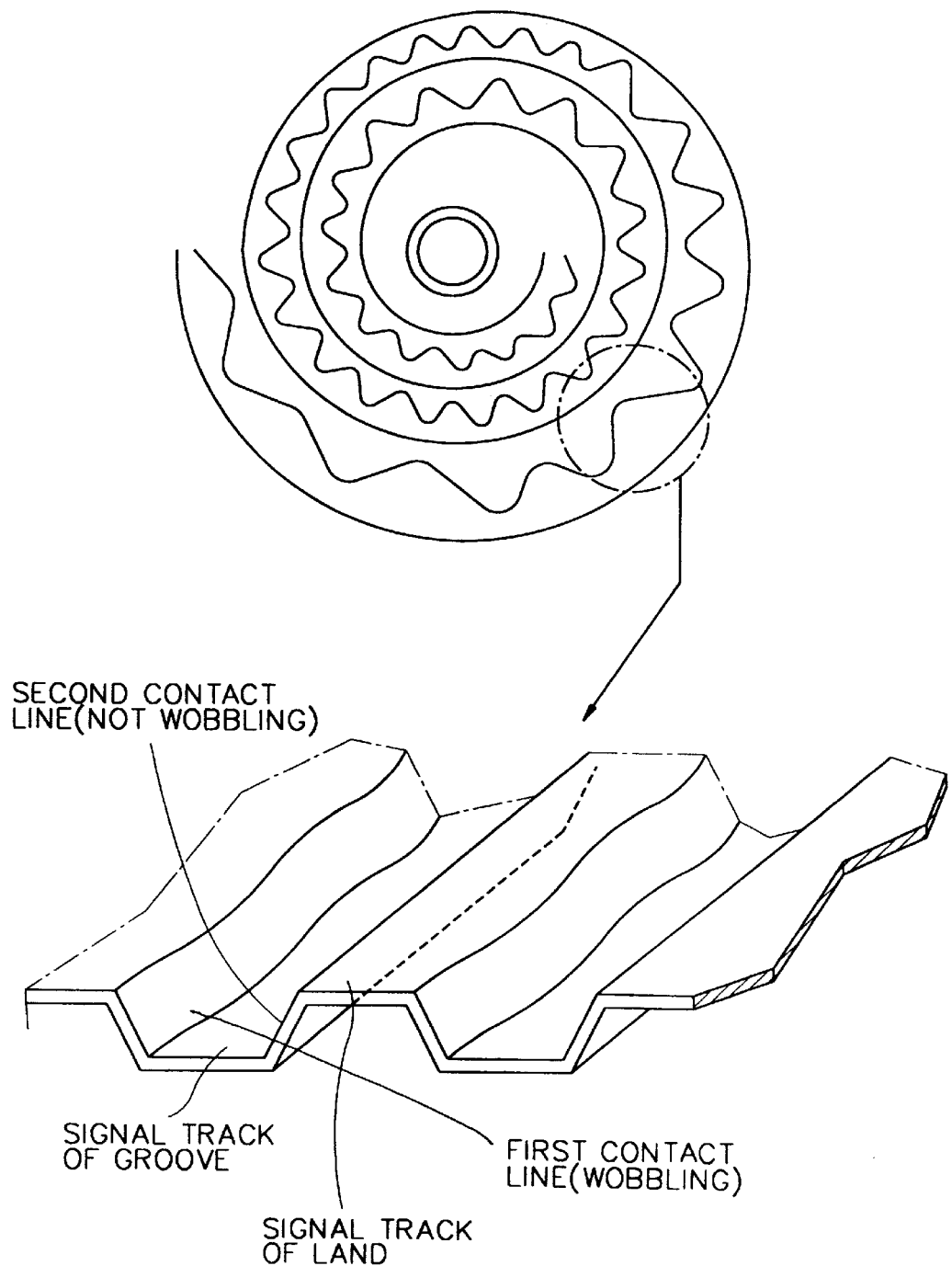
FIG. 2 is a view illustrating an optical disk having a single-side wobbling structure of a conventional CD-R.
Figure 3:
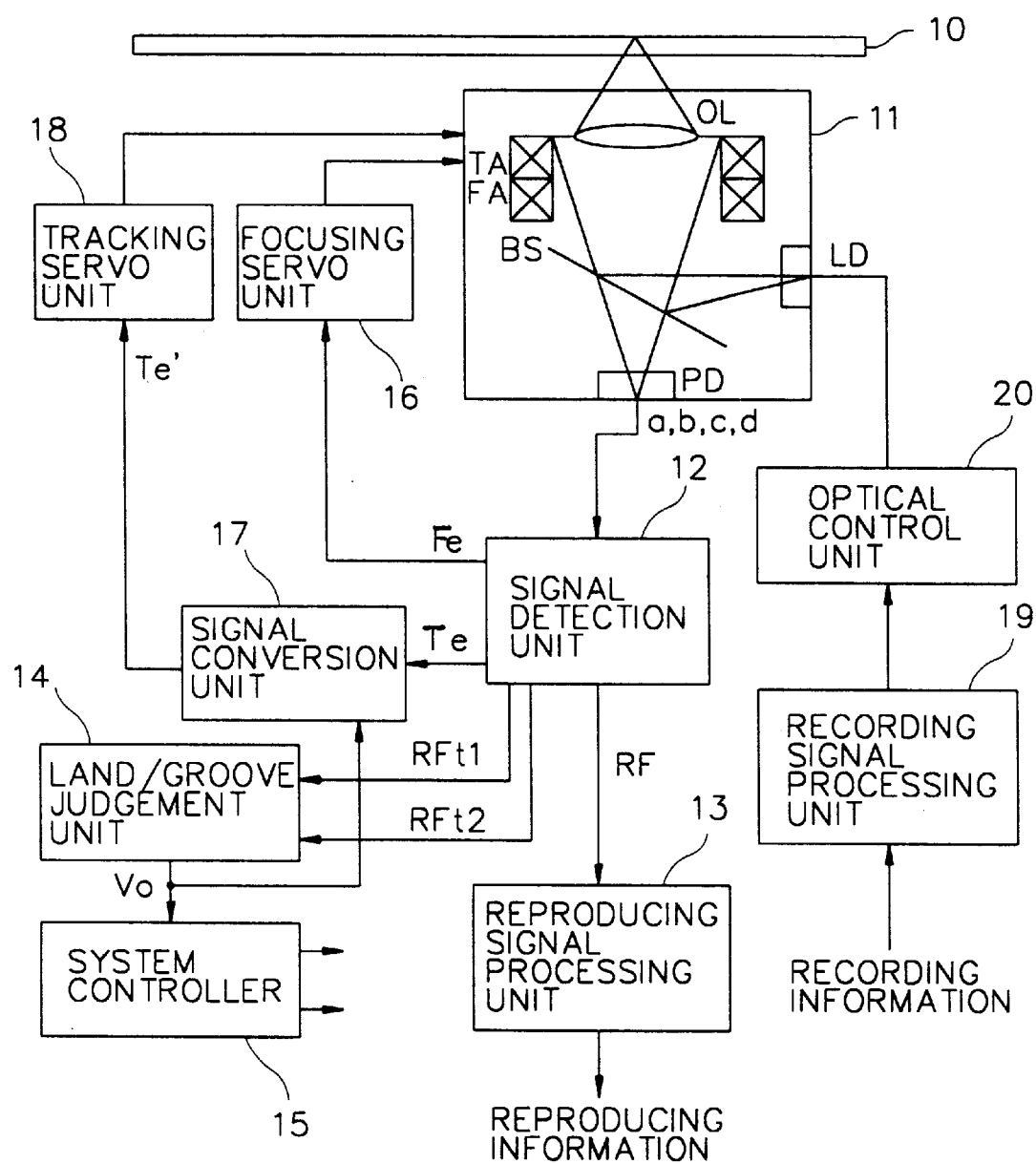
FIG. 3 is a block diagram illustrating an information recording/reproducing apparatus according to the present invention.

FIG. 3 illustrates an information recording and reproducing apparatus according to the present invention.

As shown therein, the information recording and reproducing apparatus according to the present invention includes an optical disk 10, an optical pickup unit 11 for scanning laser beam onto the optical disk 10 and converting the beam reflected by the optical disk 10 into electrical signals a, b, c, and d, a signal detection unit 12 for detecting a focus control signal Fe, a tracking control signal Te, and frequency reproducing signals Rf, RFt1 and RFt2 from the electrical signals from the optical pickup unit 11, a reproducing signal processing unit 13 for processing the frequency reproducing signal RF from the signal detection unit 12 and outputting a reproducing information, a land and groove track judgement unit 14 for comparing the size of envelope of the high frequency reproducing signals RFt1 and RFt2 from the signal detection unit 12 and judging whether the optical beam is made incident on the land or the groove, a system controller 15 for performing the control operation of the system, a focusing servo unit 16 for performing a focus control of the optical pickup unit 11, a signal conversion unit 17 for passing through or inverting the tracking control signal Te in accordance with the land/groove judgement signal V0 from the land and groove track judgement unit 14, a tracking servo unit 18 for performing a tracking control of the optical pickup unit 11, a recording signal processing unit 19 for processing a recording information based on the recording format, and an optical controller 20 for controlling the amount of beam from the optical pickup unit 11 in accordance with the output from the recording signal processing unit 19.

The optical pickup unit 11 includes a laser diode LD for generating optical beams in accordance with a control of the optical controller 20, a beam splitter BS for reflecting beam generated by the laser diode LD, an objective lens OL for condensing the optical beam reflected by the beam splitter BS onto a signal track, a tracking controller TA and a focus driver FA for controlling a tracking and focusing operation so that the objective lens OL accurately condenses an optical beam on the signal track in accordance with the controls by the focusing servo unit 16 and the tracking servo unit 18, and a photo-detection unit PD for outputting electrical signals a, b, c and d which are proportional to the optical beam reflected by the optical disk 10.

Figure 5:
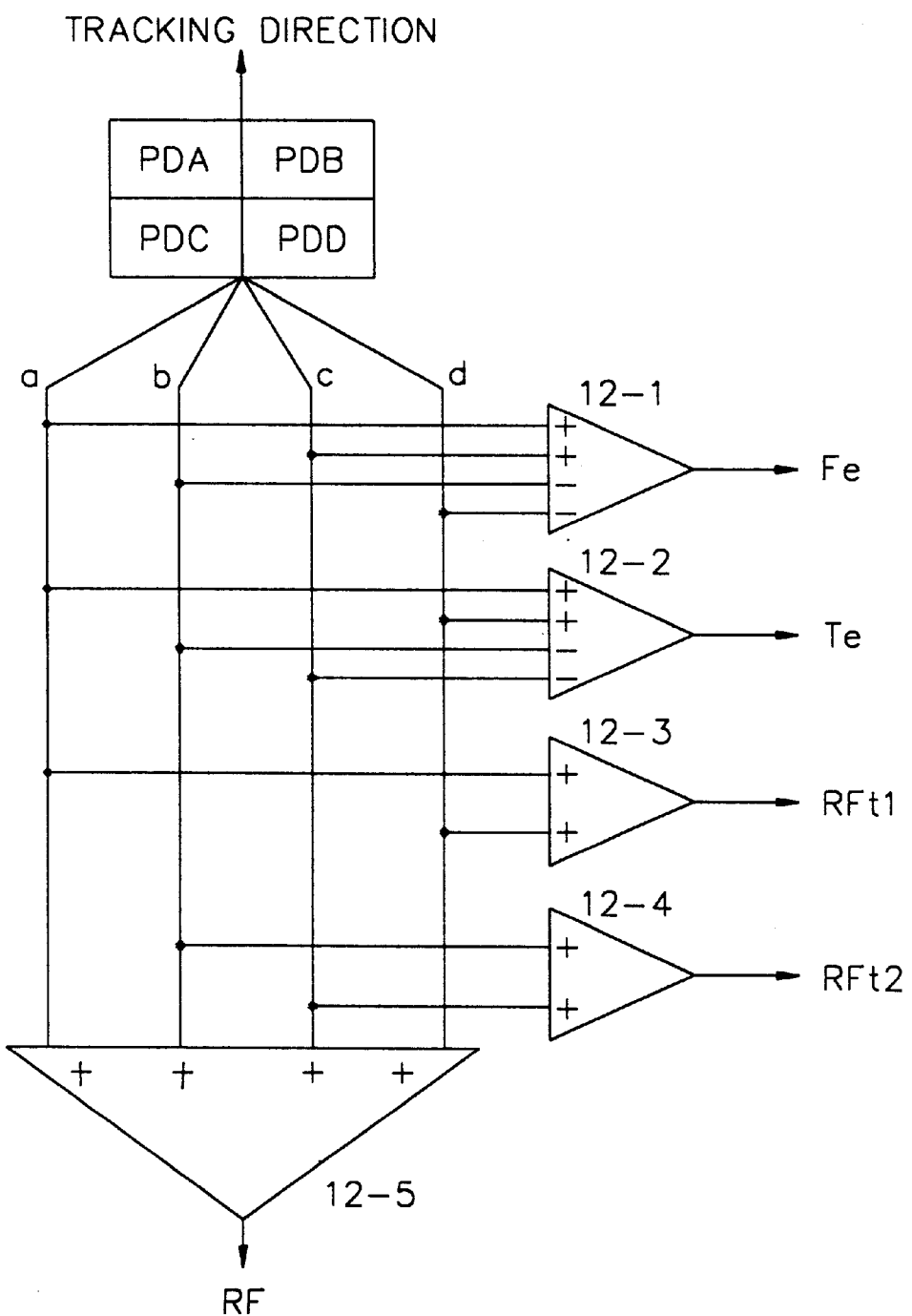
FIG. 5 is a view illustrating a photo-detection unit PD and a signal detection unit in the circuit of FIG. 3 according to the present invention.

The photo-detection unit PD, as shown in FIG. 5, includes four photo-detection devices PDA through PDD which are split into four directions, for example, into the track direction and the radial direction of the optical disk 10, respectively, and the signal detection unit 12 receives the electrical signals a, b, c, and d from the photo-detection unit PD, an adder 12-1 for outputting a focus control signal Fe through an operation of (a+c)−(b+d), an adder 12-2 for outputting a tracking control signal Te through an operation of (a+d)-(b+c), an adder 12-3 for outputting a high frequency reproducing signal RFt1 through an operation of (a+d), an adder 12-4 for outputting a high frequency reproducing signal RFt2 through an operation of (b+c), and an adder 12-5 for outputting a high frequency reproducing signal RF through an operation of (a+b+c+d).

Figure 6:
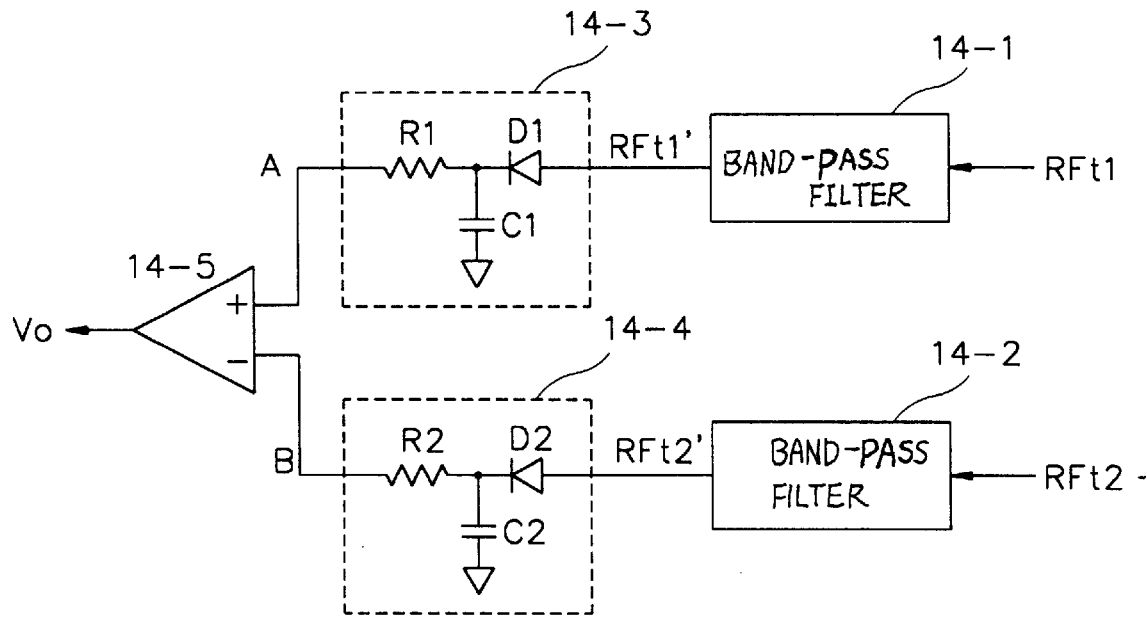
FIG. 6 is a circuit diagram illustrating a land/groove track judgement unit in the circuit of FIG. 3 according to the present invention.

In addition, the land and groove track judgement unit 14, as shown in FIG. 6, includes band-pass filters 14-1 and 14-2 for filtering the high frequency signals RFt1 and RFt2 from the signal detection unit 12, envelope detection units 14-3 and 14-4 for detecting the envelopes of the high frequency reproducing signals RFt1 and RFt2 from the band-pass filters 14-1 and 14-2, and a comparator 14-5 for comparing the size of the envelopes detected by the envelope detection units 14-3 and 14-4 and outputting a land/groove track judgement signal V0.

Figure 7:
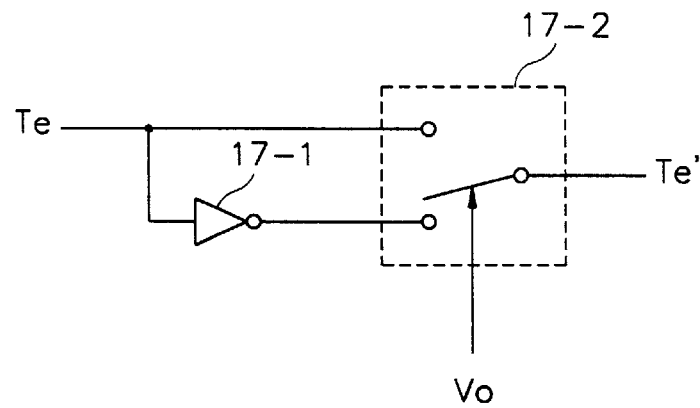
FIG. 7 is a circuit diagram illustrating a signal conversion unit in the circuit of FIG. 3 according to the present invention.

The signal conversion unit 17, as shown in FIG. 7, includes an inverter 17-1 for inverting a tracking control signal Te outputted from the signal detection unit 12, and a switch 17-2 for selectively outputting a tracking control signal Te or an inverter tracking control signal Te' in accordance with a land/groove judgement signal V0 outputted from the land and groove track judgement unit 14.

The operation of an information recording/reproducing apparatus according to the present invention will now be explained with reference to the accompanying drawings.

Figure 4A:
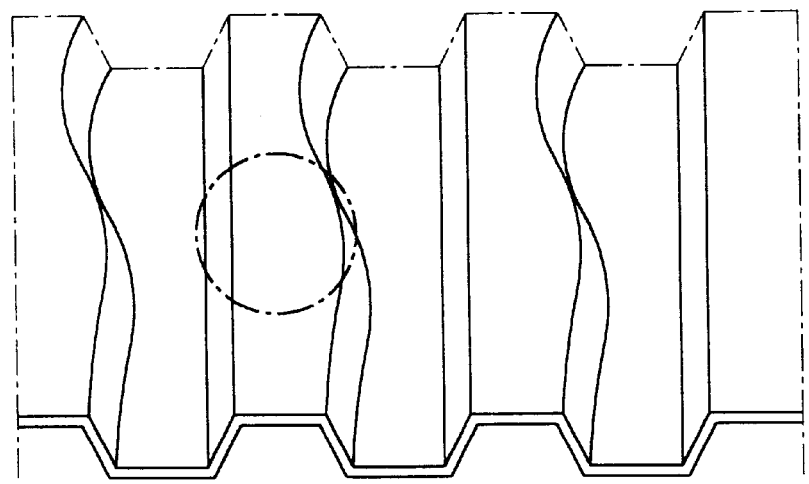
FIGS. 4A and 4B are views illustrating optical beams scanned over an optical disk having a single-side wobbling structure according to the present invention.
Figure 4B:
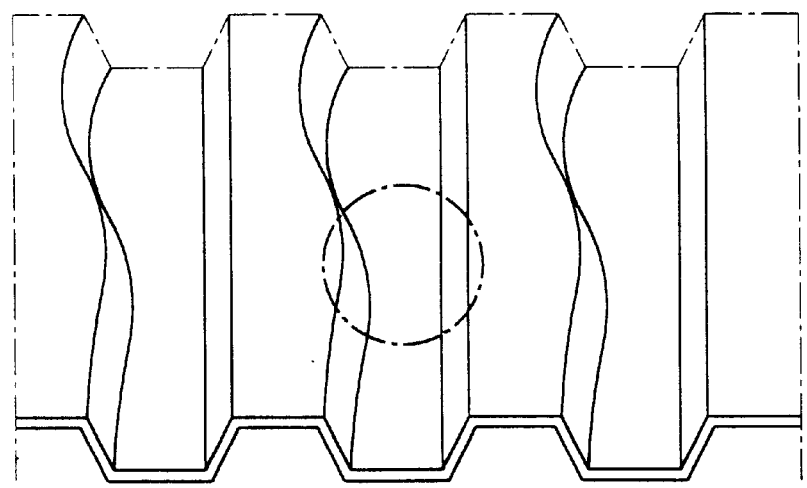

The optical beam from the laser diode LD is reflected by the beam splitter BS and then is condensed by the objective lens OL, and the thusly condensed beam is made incident on the signal track having a land and groove of the optical disk 10 formed in a single-side wobbling structure as shown in FIGS. 4A and 4B.

In addition, the beam reflected by the signal track of land or groove of the optical disk 10 is made incident onto the photo-detection unit PD through the objective lens OL, and four photo-detection units PDA through PDD output electrical signals a, b, c, and d which are proportional to the amount of beams and split into track directions and radial directions.

The adder 12-1 of the signal detection unit 12 outputs a focus control signal Fe through an operation of (a+c)−(b+d), and the adder 12-2 outputs a tracking control signal Te through an operation of (a+d)−(b+c). In addition, the adder 12-2 outputs a high frequency reproducing signal RFt1 through an operation of (a+d), the adder 12-3 outputs a high frequency reproducing signal RFt2 through an operation of (b+c), and the adder 12-4 outputs a high frequency reproducing signal RF through an operation of (a+b+c+d).

The beam condensed by the objective lens OL is made incident on the land track as shown in FIG. 4A or on the groove track as shown in FIG. 4B.

The electrical signals a, b, c and d from the photodetection units PDA through PDD of the signal detection unit 12 may be classified into lefthand electrical signals a and d and righthand electrical signals b and c with respect to the track center line.

Therefore, the land and groove track judgement unit 14 receives the high frequency reproducing signal RFt1 corresponding to the lefthand electrical signals a and d and the high frequency reproducing signal RFt2 corresponding to the righthand electrical signals b and c with respect to the track center line from the adder 12-3 of the signal detection unit 12, filters the signals to frequency band signals through the band-pass filters 14-1 and 14-2, and detects the envelopes of the filtered high frequency reproducing signals RFt1' and RFt2' by using the envelope detection units 14-3 and 14-4.

Figure 8A:
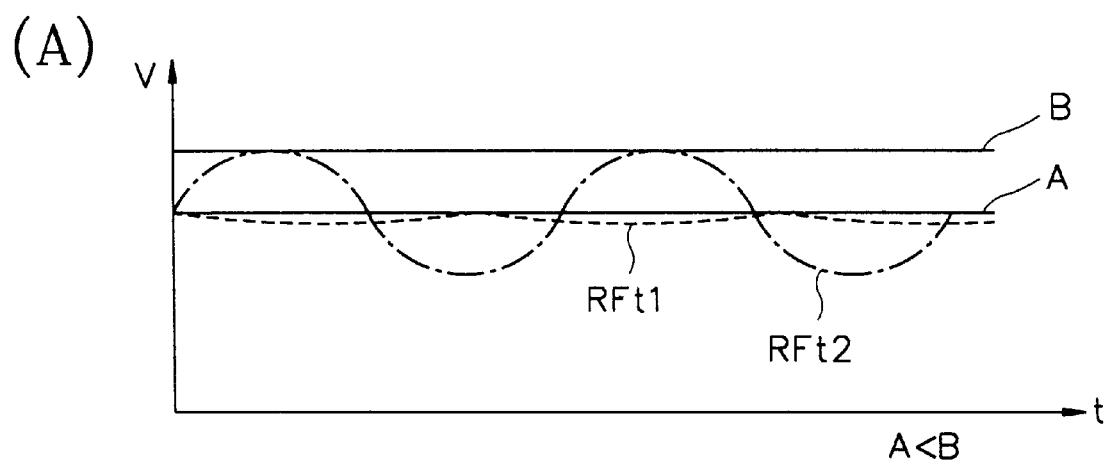
FIGS. 8A and 8B are views illustrating the reasons why the polarity of the tracking error signal is changed in accordance with a condition whether a beam is made incident on a land portion or a groove portion.

For example, assuming that the beams condensed by the objective lens OL, as shown in FIG. 4A, are made incident on the land track, the high frequency reproducing signals RFt1' and RFt2' passed through the band-pass filters 14-1 and 14-2 appear as shown in FIG. 8A, and the envelopes of the high frequency reproducing signals RFt1' and RFt2' appear as lines A and B.

At this time, as shown in FIG. 8A, the envelope B is greater than the envelope A because in the righthand electrical signals b and c, the amount of beams reflected by the wobbling is greatly varied, and the maximum value thereof is greater than a portion in which there is no wobbling.

As a result, since the envelop B is greater than the envelope A, the comparator 14-5 outputs a negative (−) land/groove judgement signal V0, and the beam condensed by the object lens OL is judged to be made incident on the land track.

Figure 8B:
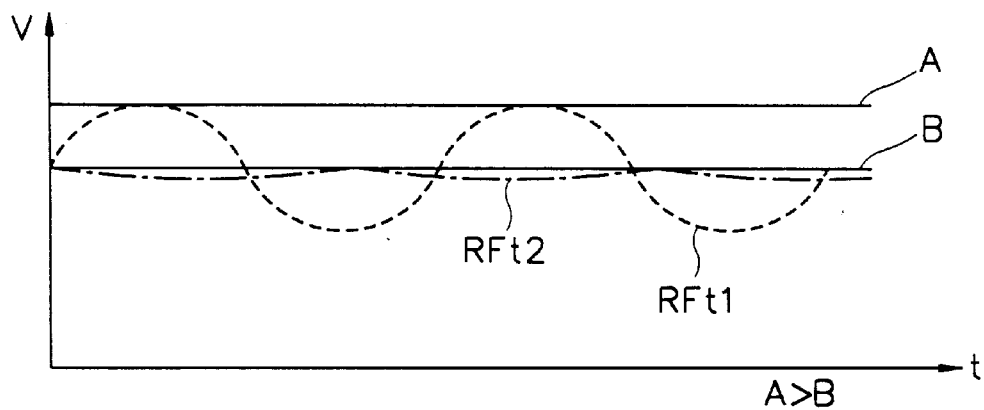

In addition, assuming that the beam condensed by the object lens OL is made incident on the groove track as shown in FIG. 4B, the high frequency reproducing signals RFt1' and RFt2' passed through the band-pass filters 14-1 and 14-2 appear as lines A and B as shown in FIG. 8B.

Therefore, since the envelope A is greater than the envelope B, the comparator 14-5 outputs a positive (+) land/groove judgement signal V0, and the beams condensed by the objective lens OL is judged to be made incident on the groove track.

The thusly obtained land/groove judgement signal V0 is inputted into the signal conversion unit 17 and the system controller, respectively, and the recording and reproducing operation is performed under a proper condition corresponding to the tracks of the land or groove.

Generally, in the optical disk 10 adopting the double-side wobbling structure, the tracking servo unit 18 receives a tracking control signal Te from the signal detection unit 12, and the objective lens OL is moved in the radial direction of the disk, thus performing a focusing control.

In the optical disk 10 adopting the single-side wobbling method, the polarity of the tracking error signal Te must be changed based on a state whether the beam condensed by the object lens OL is made incident on the groove track or the land track.

Namely, as shown in FIGS. 8A ad 8B, when the tracking servo operation is performed on the groove track in which the current track center line is C, and the tracking control signal Te from the signal detection unit 12 has a positive (+) value as at the point P1, the tracking servo unit 18 is controlled in order for the optical beams to be moved in an outer circumferential direction of the disk.

In addition, when the tracking servo operation is performed with respect to the land track in which the current track center line is D, and the tracking control signal Te from the signal detection unit 12 is a positive (+) value at the point P2, the tracking servo unit 18 is controlled in order for the optical beam to be moved in an inner circumferential surface of the disk. In this case, if the tracking control signal Te is a negative (−) value, the operation is identically performed.

Finally, even when the tracking control signal Te has the identical positive (+) value, since the direction of the tracking servo becomes opposite based on the result whether the condensed beam is made incident on the land track or the groove track, if the polarity of the tracking control signal Te is changed in accordance with the land track or groove track, the tracking servo unit 18 performs a tracking servo operation in the identical direction irrespective of the land track and groove track, thus performing the tracking control in wrong direction.

The switch 17-2 of the signal conversion unit 17, as shown in FIG. 7, selectively outputs the tracking control signal Te' inverted by the tracking control signal Te or inverter 17-1 outputted from the signal detection unit 12 in accordance with a land/groove track judgement signal V0 outputted from the land and groove track judgement unit 14.

For example, when the tracking control signal Te from the signal detection unit 12 has a positive (+) value, and the condensed beam is made incident on the current groove track, namely, the signal corresponds to the positive land/groove track judgement signal V0, the switch 17-2 directly outputs the tracking control signal Te, and when the condensed beam is made incident on the current land track, namely, the signal corresponds to the negative land/groove track judgement signal V0, the switch 17-2 outputs an inverted tracking control signal Te'.

Therefore, the tracking servo unit 18 controls the tracking controller TA in accordance with the tracing control signal TE or the inverted tracking control signal Te' outputted from the signal conversion unit 17, thus performing the tracking control.

At this time, the reproducing signal processing unit 13 processes the high frequency reproducing signal RF from the signal detection unit 12 and outputs a reproducing information, and the focusing servo unit 16 controls the focus driving unit FA in accordance with the focus control signal Fe outputted from the signal detection unit 12, thus upwardly and downwardly moving the objective lens OL, thereby performing the focusing control.

In addition, when recording a data on the optical disk 10, the recording information is processed for being matched with a recording format by the recording signal processing unit 19. When the information is inputted into the optical controller 20, the optical controller 20 controls the amount of beams from the optical pickup unit 11 in accordance with a control of the system controller 15, thus recording the information on the track of the optical disk 10.

In the present invention, as described above, the tracking control may be performed based on a three-beam method. In this case, the land and groove track judgement unit 14 as shown in FIG. 6 may be directly used. The operation thereof will now be explained with reference to FIGS. 9 and 10.

Figure 10A:
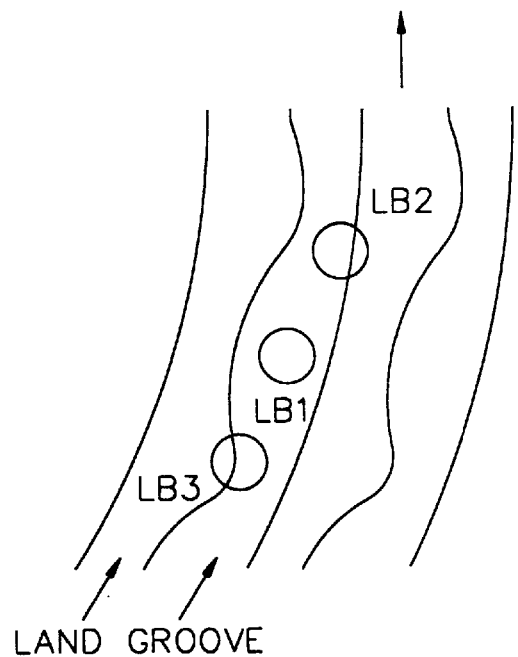
FIGS. 10A and 10B are views illustrating a main beam and an auxiliary beam scanned on an optical disk in a three-beam method according to the present invention.
Figure 10B:
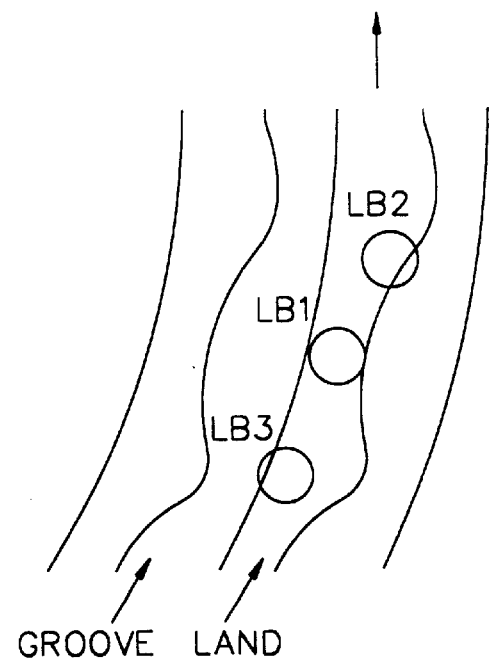
Figure 11:
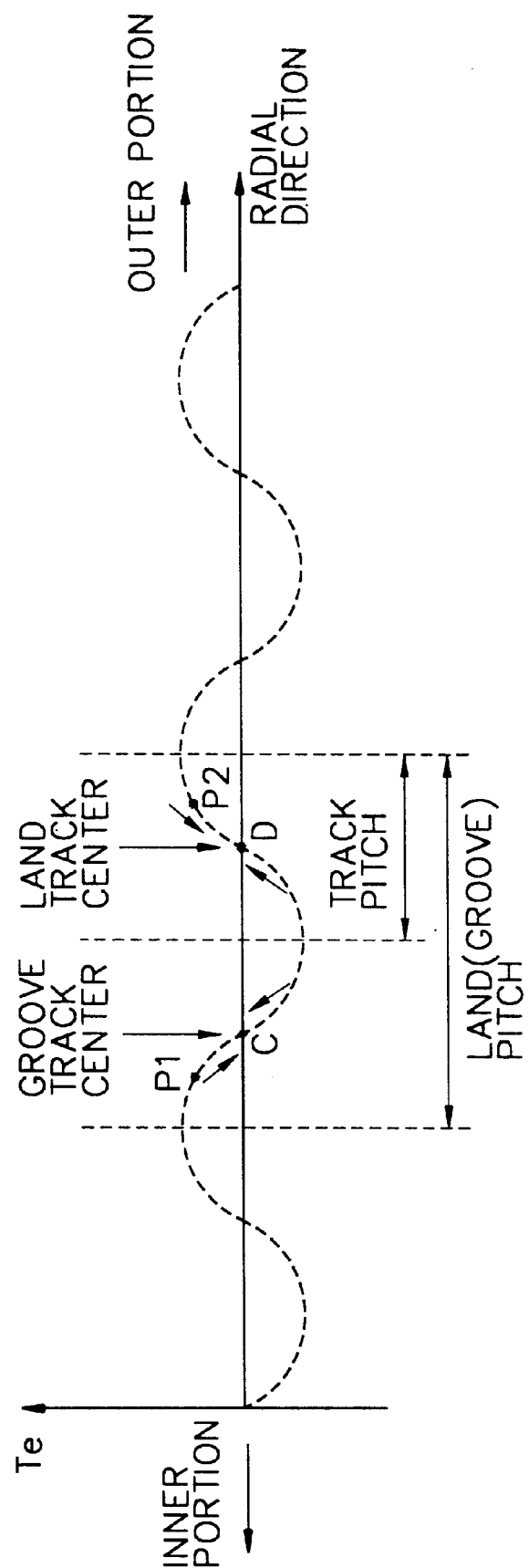
FIG. 11 is a view illustrating a method for changing a polarity of a tracking error signal based on the state where the current beam is positioned on the land or the groove.

First, one main beam LB1 and two auxiliary beams LB2 and LB3 among three beams from the optical pickup unit 11, as shown in FIGS. 10A and 10B, are made incident on the land or groove signal track of the optical disk 10 having a single-side wobbling structure.

Figure 9:
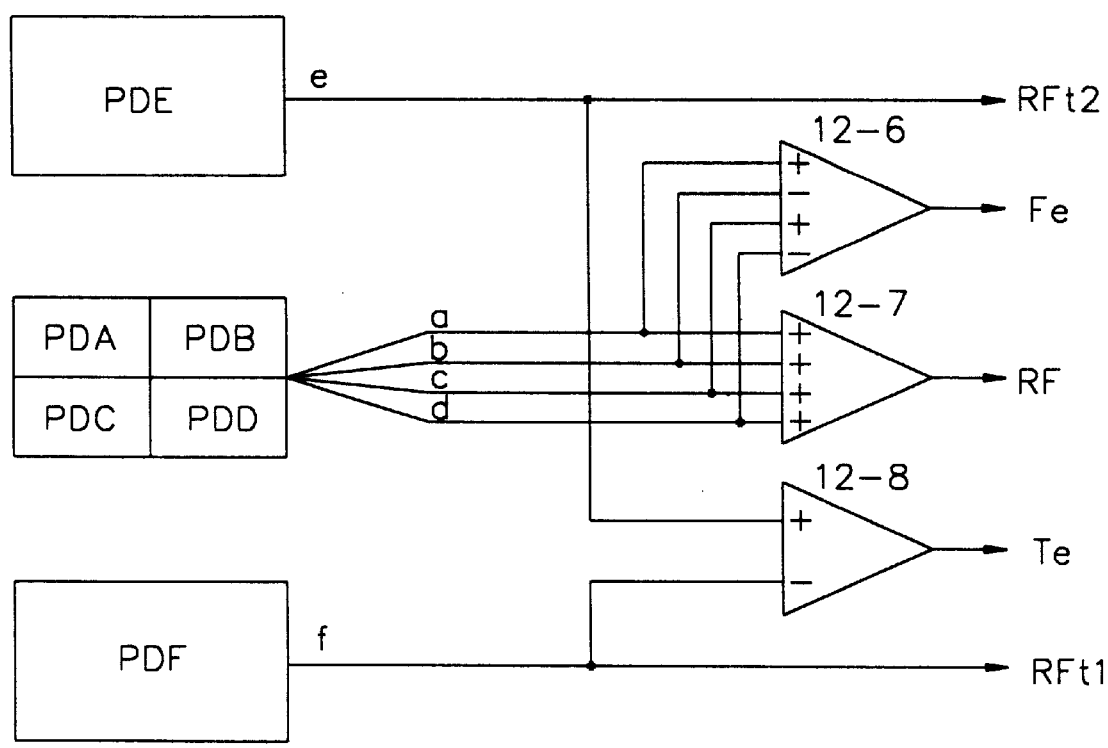
FIG. 9 is a view illustrating a photo-detection unit PD and a signal detection unit in a three-beam method according to the present invention.

At this time, four main photo-detection units PDA through PDD of the signal detection unit 12, as shown in FIG. 9, detect the amount of main beams reflected by the optical disk 10, and outputs electrical signals a, b, c and d, and the auxiliary photo-detection units PDE through PDF detect the amount auxiliary beams LB2 and LB3 and output electrical signals e and f.

In addition, the adder 12-6 of the signal detection unit 12 outputs a focus is control signal Fe through an operation of (a+c)−(b+d), the adder 12-7 outputs a high frequency reproducing signal RF through an operation of (a+b+c+d), and the adder 12-8 outputs a tracking control signal Te through an operation of (e−f).

The electrical signals e and f corresponding to the auxiliary beams LB2 and LB3 are inputted as high frequency signals RFt1 and RFt2 which are inputs of the land and groove track judgement unit 14 as shown in FIG. 6, so that it is possible to judge the land/track identically to the first beam method as shown in FIGS. 4A and 4B.

Namely, as shown in FIG. 10A, the position of the current optical beam is related to the track of the groove, the electrical signal f becomes a high frequency reproducing signal RFt1 by the wobbling as shown in FIG. 8B, and since the electrical signal e is related to a portion in which the wobbling is not provided, the high frequency reproducing signal RFt2 appears as shown in FIG. 8B.

As a result, the comparator 14-5 outputs a positive (+) land/groove judgement signal V0, so that the output therefrom is judged to be related to the track of the groove.

Therefore, the signal conversion unit 17 selectively outputs a tracking control signal Te or an inverted tracking control signal Te' from the signal detection unit 12 in accordance with a land/groove track judgement signal V0 from the land and groove track judgement unit 14, so that the tracking control is performed by the tracking servo unit 18.

In addition, the optical disk may be adopted to the optical disk, and the photo-detection unit PD which is split into the track direction and the radial direction of the optical disk 10 and the photo-detection unit PD which is split into lefthand portion and righthand portion with respect to the track may be used.

The recording/reproducing co-using apparatus was described so far. The same may be adapted to the recording exclusive or reproducing exclusive apparatus.

In addition, the envelopes of the high frequency reproducing signals RFt1' and RFt2' passed through the first and second band-pass filters 14-1 and 14-2 are detected by using the envelop detection unit in the land and groove track judgement unit 14. Another element may be used for computing the maximum value or mean value of the high frequency reproducing signals RFt1' and RFt2'.

As described above, in the present invention, the land and groove are judged from the recording medium in a single-side wobbling method, and the polarity of the tracking control signal is varied in accordance with the judged land/groove judgement signals, thus more effectively performing the tracking control.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. An information recording and reproducing apparatus using a recording medium in which one contact surface is wobbled in one track among a first track and a second track neighboring with the first track, comprising:

a signal detection unit for detecting lefthand and righthand detection signals from an optical beam with respect to a track center line of the first track or second track and producing a tracking control signal based on the lefthand and righthand detection signals;

a land/groove track judgment unit for comparing the lefthand and righthand detection signals outputted from the signal detection unit and judging whether a track on which the current optical beam is incident is a track of a land or a track of a groove, as a result of the comparison;

a signal conversion unit for passing-through or inverting the tracking control signal in accordance with a land/groove judgement signal from the land/groove track judgement unit; and a tracking servo unit for performing a tracking control of an optical pickup unit in accordance with a tracking control signal from the signal conversion unit.

2. The apparatus of claim 1, wherein said land/groove track judgement unit compares maximum values of the lefthand and righthand detection signals.

3. The apparatus of claim 1, wherein said land/groove track judgement unit includes:

first and second band-pass filters for filtering lefthand and righthand detection signals from the signal detection unit;

first and second envelope detection units for detecting the envelopes of the lefthand and righthand detection signals from the first and second band-pass filters; and a comparator for comparing the sizes of the envelopes detected by the first and second envelope detection units and outputting the land/groove track judgement signal.

4. The apparatus of claim 3, wherein said land/groove track judgement unit includes first and second maximum value detection units for detecting a maximum value of the lefthand and righthand detection signals instead of the first and second envelop detection units.

5. The apparatus of claim 1, wherein said signal conversion unit includes:

an inverter for inverting the tracking control signal from the signal detection unit; and a switch for selecting the tracking control signal or an output from the inverter in accordance with the land/groove judgement signal from the land/groove track judgement unit.

6. A method for recording/reproducing optical information on/from a recording medium having a wobbled groove wherein one contact surface is wobbled in one track among a first track and a second track neighboring with the first track, the method comprising:

detecting lefthand and righthand signals with respect to a track direction by reflecting an optical beam off the first track or second track;

converting the lefthand and righthand detection signals into left and right second signals, respectively;

comparing the left and right second signals; and as a result of the comparison, judging whether a track, on which the current optical beam is positioned, is related to a first track or a second track.

7. The method of claim 6, wherein said comparison step compares the maximum values of the lefthand and righthand detection signals.

8. The method of claim 6, wherein said comparison step compares the envelope detection values of the lefthand and righthand detection signals.

9. The method of 6, wherein said first track and second track are a track of a land and a track of a groove which both have a wobbling.

10. An information recording and reproducing apparatus using a recording medium in which one contact surface is wobbled in one track among a first track and a second track neighboring with the first track, comprising the steps of:

detecting lefthand and righthand detection signals split into the lefthand and righthand directions with respect to a track direction by scanning an optical beam on the first track or the second track, subtracting the detected lefthand and righthand detection signal to produce a difference signal, and producing a tracking control signal based on said difference signal;

detecting a maximum value or an envelope value of the lefthand and righthand detection signals;

comparing the lefthand and righthand maximum values or the envelope values;

as a result of the comparison, judging whether a track in which a current optical beam is positioned is related to the first track or the second track; and performing tracking control by using the tracking control signal when the track is the first track as a result of the comparison and performing a tracking control by using an inversion of the tracking control signal when the track is the second track as a result of the comparison.

11. The method of claim 10, wherein said first track and second track are a track of a land and a track of a groove, respectively, which both wobble.

12. The apparatus of claim 1, wherein said land/groove track judgement unit compares envelope values of the lefthand and righthand detecting signals.

* * * * *